(12) United States Patent
Chun et al.

(10) Patent No.: US 9,363,056 B2
(45) Date of Patent: Jun. 7, 2016

(54) METHOD AND APPARATUS FOR SETTING PLURALITY OF REFERENCE SIGNAL CONFIGURATIONS IN WIRELESS COMMUNICATION SYSTEM

(71) Applicant: LG ELECTRONICS INC., Seoul (KR)

(72) Inventors: Jin Young Chun, Anyang-si (KR); Ki Tae Kim, Anyang-si (KR); Su Nam Kim, Anyang-si (KR); Sung Ho Park, Anyang-si (KR); Bin Chul Ihm, Anyang-si (KR); Ji Won Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 14/348,492

(22) PCT Filed: Sep. 28, 2012

(86) PCT No.: PCT/KR2012/007936
§ 371 (c)(1),
(2) Date: Mar. 28, 2014

(87) PCT Pub. No.: WO2013/048192
PCT Pub. Date: Apr. 4, 2013

(65) Prior Publication Data
US 2014/0241199 A1 Aug. 28, 2014

Related U.S. Application Data

(60) Provisional application No. 61/540,521, filed on Sep. 28, 2011.

(51) Int. Cl.
*H04L 5/00* (2006.01)
*H04W 24/08* (2009.01)
*H04J 11/00* (2006.01)

(52) U.S. Cl.
CPC ............ *H04L 5/0048* (2013.01); *H04J 11/0023* (2013.01); *H04J 11/0079* (2013.01); *H04L 5/0035* (2013.01); *H04W 24/08* (2013.01)

(58) Field of Classification Search
CPC ... H04L 5/0048; H04L 5/0035; H04W 24/08; H04J 11/00; H04J 11/0023
See application file for complete search history.

(56) References Cited

U.S. PATENT DOCUMENTS

2012/0002596 A1* 1/2012 Kim .................... H04B 7/0413
370/315
2012/0088458 A1* 4/2012 Nogami ............... H04B 7/0632
455/67.11

(Continued)

FOREIGN PATENT DOCUMENTS

KR 10-2010-0116550 11/2010
KR 10-2011-0000538 1/2011

(Continued)

OTHER PUBLICATIONS

3rd Generation Partnership Project (3GPP), "Technical Specification Group Radio Access Network; Evolved Universal Terrestrial Radio Access (E-UTRA); Physical channels and modulation (Release 10)," 3GPP TS 36.211 V10.0.0, Dec. 2010, 103 pages.
Korean Intellectual Property Office Application Serial No. 10-2014-7007951, Office Action dated Jul. 13, 2015, 6 pages.

(Continued)

*Primary Examiner* — Brian D Nguyen
(74) *Attorney, Agent, or Firm* — Lee, Hong, Degerman, Kang & Walmey; Jonathan Kang; Michael Monaco

(57) ABSTRACT

Provided are a method for operating a user equipment in a wireless communication system and the user equipment for performing same. The user equipment receives a plurality of channel state information (CSI) reference signal (RS) configurations for indicating different usages, and performs an action based on each of the CSI RS configurations.

15 Claims, 11 Drawing Sheets

(56) References Cited

U.S. PATENT DOCUMENTS

| | | | | |
|---|---|---|---|---|
| 2012/0106374 A1* | 5/2012 | Gaal | H04L 5/0048 | 370/252 |
| 2012/0134273 A1* | 5/2012 | Bhattad | H04L 5/0048 | 370/241 |
| 2012/0264441 A1* | 10/2012 | Chandrasekhar | H04L 5/0073 | 455/450 |
| 2012/0281556 A1* | 11/2012 | Sayana | H04B 7/024 | 370/252 |
| 2012/0287875 A1* | 11/2012 | Kim | H04L 5/0048 | 370/329 |
| 2013/0010880 A1* | 1/2013 | Koivisto | H04B 7/0469 | 375/259 |
| 2013/0017793 A1* | 1/2013 | Henttonen | H04W 52/52 | 455/63.1 |
| 2013/0021925 A1* | 1/2013 | Yin | H04B 7/024 | 370/252 |

FOREIGN PATENT DOCUMENTS

| | | |
|---|---|---|
| KR | 10-2011-0030372 | 3/2011 |
| KR | 10-2011-0083445 | 7/2011 |
| WO | 2011/115421 | 9/2011 |

OTHER PUBLICATIONS

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.3.0, Sep. 2011, 122 pages.

CATT, "Considerations on Interference Measurement and its Specification Impact in CoMP," 3GPP TSG RAN WG1 Meeting #66, R1-112110, Aug. 2011, 4 pages.

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.1.0, Mar. 2011, 103 pages.

3rd Generation Partnership Project (3GPP), "Technical Specification Group Radio Access Network; Evolved Universal Terrestrial Radio Access (E-UTRA); Radio Resource Control (RRC); Protocol specification (Release 10)," 3GPP TS 36.331 V10.1.0, Mar. 2011, 290 pages.

Japan Patent Office Application Serial No. 2014-531739, Office Action dated Feb. 23, 2015, 6 pages.

ETSI, LTE: Evolved Universal Terrestrial Radio Access (E-UTRA); Physical channel and modulation; 3GPP TS 36.211 version 10.0.0 Release 10, XP002694954, Jan. 2011, 18 pages.

European Patent Office Application Serial No. 12837215.8, Search Report dated Jun. 8, 2015, 7 pages.

* cited by examiner

METHOD AND APPARATUS FOR SETTING PLURALITY OF REFERENCE SIGNAL CONFIGURATIONS IN WIRELESS COMMUNICATION SYSTEM

CROSS-REFERENCE TO RELATED APPLICATIONS

This application is the National Stage filing under 35 U.S.C. 371 of International Application No. PCT/KR2012/007936, filed on Sep. 28, 2012, which claims the benefit of U.S. Provisional Application Ser. No. 61/540,521, filed on Sep. 28, 2011, the contents of which are all hereby incorporated by reference herein in their entirety.

BACKGROUND OF THE INVENTION

1. Field of the Invention

The present invention relates to wireless communications, and more particularly, to a method and apparatus for setting a plurality of reference signal configurations in a wireless communication system.

2. Related Art

The next-generation multimedia wireless communication systems which are recently being actively researched are required to process and transmit various pieces of information, such as video and wireless data as well as the initial voice-centered services. The 4$^{th}$ generation wireless communication systems which are now being developed subsequently to the 3$^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS.

Effective reference signal (RS) configurations for the DMNS are required.

SUMMARY OF THE INVENTION

The present invention provides a method and apparatus for setting a plurality of reference signal configurations in a wireless communication system. The present invention provides a method for setting a plurality of channel state information (CSI) reference signal (RS) configurations according to usages.

In an aspect, a method of operating by a user equipment (UE) in a wireless communication system is provided. The method includes receiving at least one first channel state information (CSI) reference signal (RS) configuration indicating a first usage from a base station, receiving at least one second CSI RS configuration, which is different from the at least first CSI RS configuration, indicating a second usage different from the first usage from the base station, performing a first action based on the first usage, and performing a second action based on the second usage.

In another aspect, a user equipment (UE) in a wireless communication system is provided. The UE includes a radio frequency (RF) unit for transmitting or receiving a radio signal, and a processor connected to the RF unit, and configured to receive at least one first channel state information (CSI) reference signal (RS) configuration indicating a first usage from a base station, receive at least one second CSI RS configuration, which is different from the at least first CSI RS configuration, indicating a second usage different from the first usage from the base station, perform a first action based on the first usage, and perform a second action based on the second usage.

A plurality of CSI RS configurations can be used according to usages in a distributed multi-node system.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
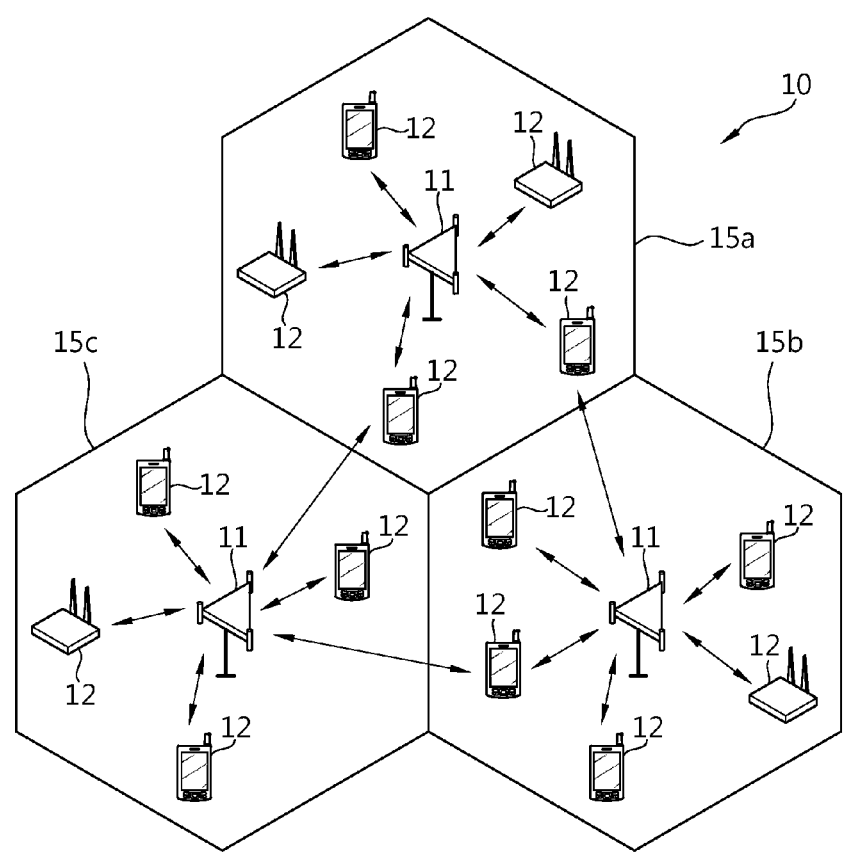
FIG. 1 shows a wireless communication system.

FIG. 1 shows a wireless communication system.

The wireless communication system 10 includes at least one base station (BS) 11.

Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
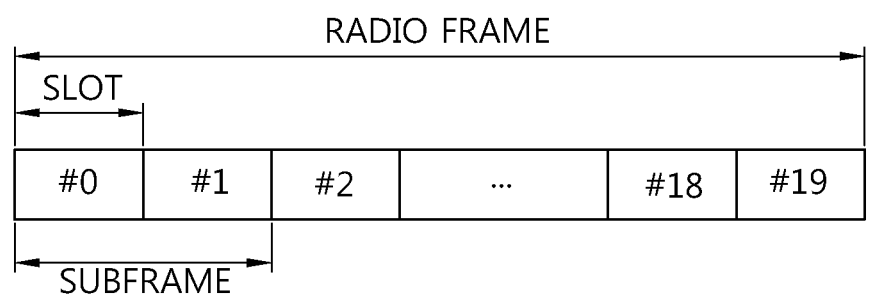
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
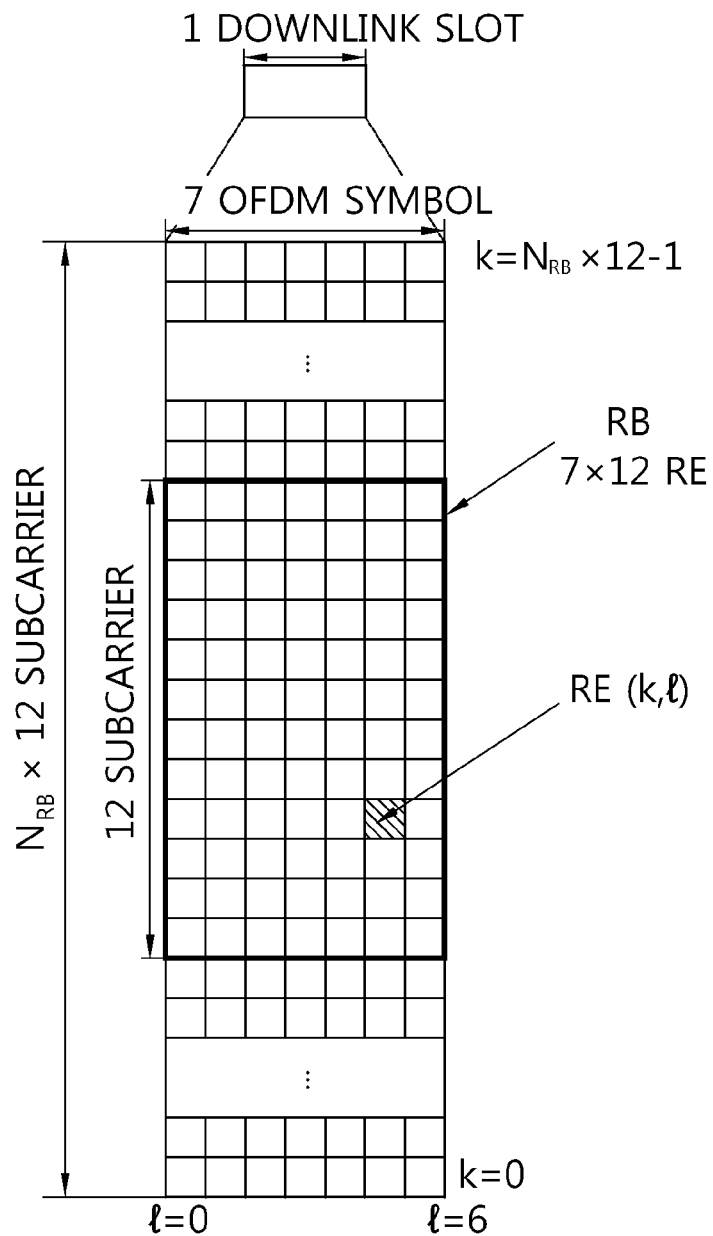
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k, 1) in the slot. Here, k (k=0, ..., $N_{RB} \times 12-1$) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
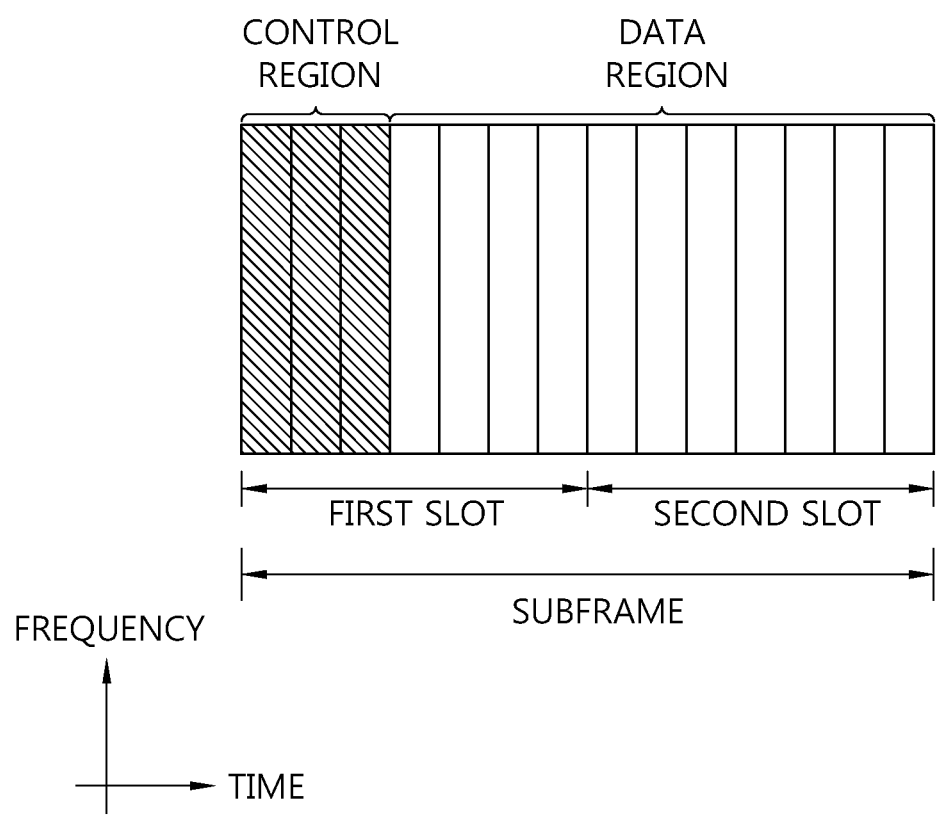
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
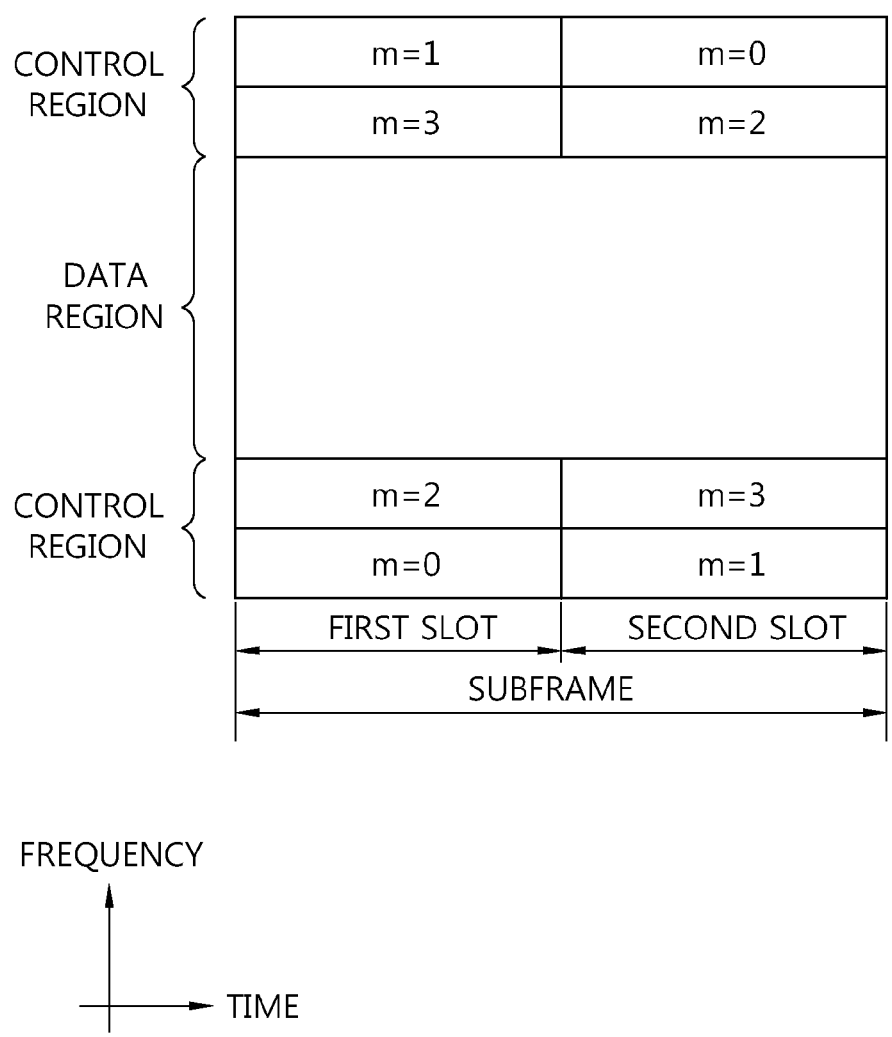
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
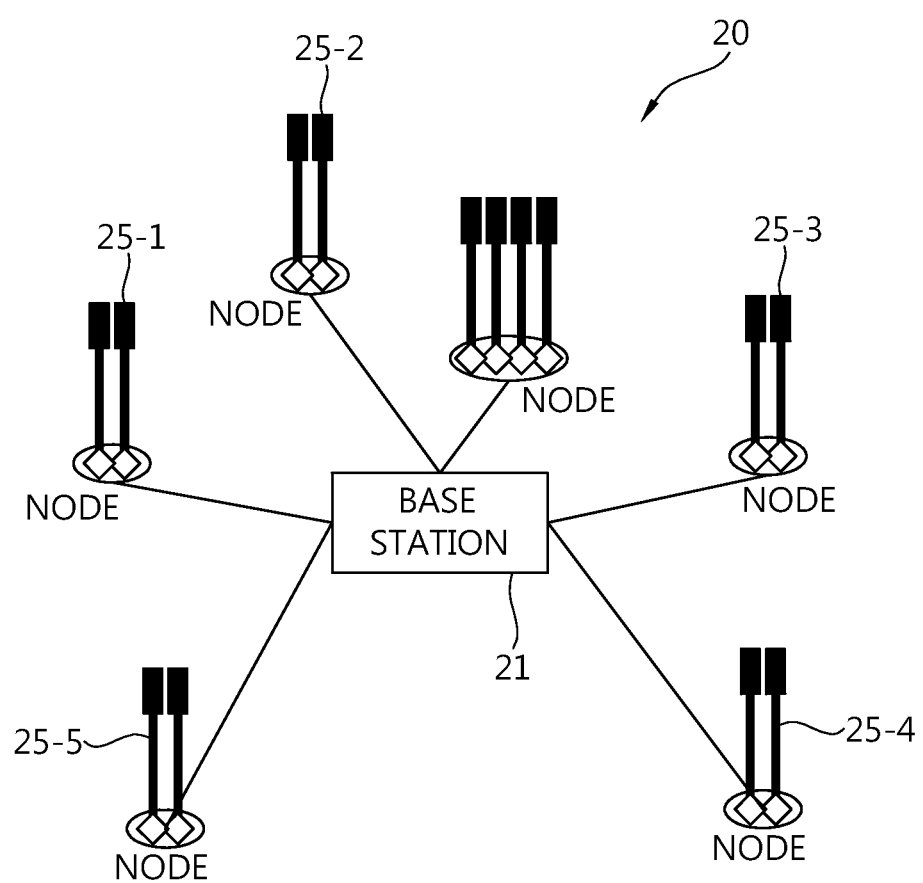
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, an embodiment of the present invention is not limited thereto, and the node may be defined as any antenna group irrespective of a physical interval. For example, an embodiment of the present invention may be applied by considering that a node consisting of horizontal polarized antennas and a node consisting of vertical polarized antennas constitute a BS consisting of a plurality of cross polarized antennas. In addition, an embodiment of the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

A coordinated multi-point (CoMP) transmission means a cooperative communication scheme between nodes. In a multi-cell distributed multi-node system, inter-cell interference may be reduced by applying the CoMP transmission. In a single cell distributed multi-node system, intra-cell inter-point interference may be reduced by applying the CoMP transmission. A UE may receive data from a plurality of nodes in common by performing the CoMP transmission. Further, each node may simultaneously support at least one UE by using the same radio frequency resource in order to improve a performance of a system. In addition, the base station may perform a space division multiple access (SDMA) scheme based on state information of a channel between the base station and the UE.

A main purpose of the CoMP transmission is to improve communication performances of UEs located at cell boundary or node boundary. In 3GPP LTE, CoMP transmission scheme may be classified into two schemes.

1) Joint processing (JP) scheme: JP scheme is a scheme of transmitting data, which is shared by at least one node, for the UE. The JP scheme includes a joint transmission (JT) scheme and a dynamic point selection (DPS) scheme. The JP scheme is a scheme where a plurality of nodes simultaneously transmits data to one UE or a plurality of UEs in time-frequency resources. The plurality of nodes transmitting the data may be all or a part of a group capable of performing the CoMP transmission. The data may be transmitted coherently or non-coherently. Accordingly, quality of a received signal and/or a data throughput may be improved. The DSP scheme is a scheme where one node in a group capable of performing the CoMP transmission transmits data in time-frequency resources. In the DSP scheme, even if the data can be transmitted by a plurality of nodes simultaneously, but one node selected from the plurality of nodes transmit the data. A node transmitting the data or a muting node which does not transmit the data may be changed in a subframe unit. Further, an RB pair used in a subframe may be also changed. The DSP scheme may include a dynamic cell selection (DCS) scheme.

2) Coordinated scheduling (CS)/coordinated beamforming (CB) scheme: CS/CB scheme is a scheme in which only one serving node can transmit data and the remaining nodes coordinate with the serving node through scheduling or by reducing interference of a transmission beam, due to a problem such as a limited backhaul capacity. The CS/CB scheme includes a semi-static point selection (SSPS) scheme. The SSPS scheme is a scheme in which one node transmits data to a specific UE in a specific time. The node transmitting the data may be changed by a semi-static scheme.

A reference signal is described.

In general, a reference signal is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CSI RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE rel-10 UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CSI RS is transmitted through one, two, four, or eight antenna ports. The antenna ports used for each case is p=15, p=15, 16, p=15, . . . , 18, and p=15, . . . , 22, respectively. The CSI RS may be defined only Δf=15 kHz. The CSI RS may be referred to Section 6.10.5 of the 3rd generation partnership project (3GPP) TS 36.211 V10.1.0 (2011 March) "Technical Specification Group Radio Access Network; Evolved Universal Terrestrial Radio Access (E-UTRA): Physical channels and modulation (Release 8)".

Regarding transmission of the CSI RS, a maximum of 32 configurations different from each other may be taken into account to reduce inter-cell interference (ICI) in a multi-cell environment, including a heterogeneous network (HetNet) environment. The CSI RS configuration is varied according to the number of antenna ports within a cell and CP, and neighboring cells may have the most different configurations. Also, the CSI RS configuration may be divided into two types depending on a frame structure. The two types include a type applied to both of FDD frame and TDD frame and a type applied only to the TDD frame. A plurality of CSI RS configurations may be used for one cell. For those UEs assuming non-zero power CSI RS, 0 or 1 CSI configuration may be used. For those UEs assuming zero-power CSI RS, 0 or more CSI configurations may be used.

Configuration of the CSI RS may be indicated by a higher layer. CSI-RS-Config information element (IE) transmitted via the higher layer may indicate the configuration of the CSI RS. Table 1 represents an example of the CSI-RS-Config IE.

TABLE 1

```
-- ASN1START
CSI-RS-Config-r10 ::=   SEQUENCE {
    csi-RS-r10          CHOICE {
        release         NULL,
        setup           SEQUENCE {
            antennaPortsCount-r10   ENUMERATED {an1, an2, an4, an8},
            resourceConfig-r10      INTEGER (0..31),
            subframeConfig-r10      INTEGER (0..154),
            p-C-r10                 INTEGER (-8..15)
        }
    }                                           OPTIONAL,       -- Need ON
    zeroTxPowerCSI-RS-r10   CHOICE {
        release         NULL,
        setup           SEQUENCE {
            zeroTxPowerResourceConfigList-r10   BIT STRING (SIZE (16)),
            zeroTxPowerSubframeConfig-r10       INTEGER (0..154)
        }
    }                                           OPTIONAL        -- Need ON
}
-- ASN1STOP
```

Referring to Table 1, the antennaPortsCount field indicates the number of antenna ports which is used for transmitting the CSI RS. The resourceConfig field indicates the CSI RS configuration. The SubframeConfig field and the zeroTxPowerSubframeConfig field indicate the configuration of the subframe in which the CSI RS is transmitted.

The zeroTxPowerResourceConfigList field indicates the zero-power CSI RS configuration. The CSI RS configuration, which corresponds to the bit set up as 1 in the bitmap of 16 bits which consists of the zeroTxPowerResourceConfigList field, may set to zero-power CSI RS. More particularly, the most significant bit (MSB) of the bitmap which consists of the zeroTxPowerResourceConfigList field corresponds to the first CSI RS configuration index in case that the number of the CSI RS configured in Table 2 and Table 3 is 4. The subsequent bits of the bitmap which consists of the zeroTxPowerResourceConfigList field correspond to the CSI RS configuration index in the direction of the index increasing in case that the number of the CSI RS configured in Table 2 and Table 3 is 4. Table 2 shows the CSI RS configuration in normal CP, and Table 3 shows the CSI RS configuration in extended CP.

TABLE 2

| | | The number of the CSI RS configured | | | | | |
|---|---|---|---|---|---|---|---|
| CSI RS | | 1 or 2 | | 4 | | 8 | |
| | configuration index | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| TDD and FDD frame | 1 | (11, 2) | 1 | (11, 2) | 1 | (11, 2) | 1 |
| TDD and FDD frame | 2 | (9, 2) | 1 | (9, 2) | 1 | (9, 2) | 1 |
| TDD and FDD frame | 3 | (7, 2) | 1 | (7, 2) | 1 | (7, 2) | 1 |
| TDD and FDD frame | 4 | (9, 5) | 1 | (9, 5) | 1 | (9, 5) | 1 |
| TDD and FDD frame | 5 | (8, 5) | 0 | (8, 5) | 0 | | |
| TDD and FDD frame | 6 | (10, 2) | 1 | (10, 2) | 1 | | |
| TDD and FDD frame | 7 | (8, 2) | 1 | (8, 2) | 1 | | |
| TDD and FDD frame | 8 | (6, 2) | 1 | (6, 2) | 1 | | |
| TDD and FDD frame | 9 | (8, 5) | 1 | (8, 5) | 1 | | |

TABLE 2-continued

| | | The number of the CSI RS configured | | | | | |
|---|---|---|---|---|---|---|---|
| | CSI RS | 1 or 2 | | 4 | | 8 | |
| | configuration index | (k', l') | $n_s$ mod 2 | (k', l') | $n_s$ mod 2 | (k', l') | $n_s$ mod 2 |
| TDD and FDD frame | 10 | (3, 5) | 0 | | | | |
| TDD and FDD frame | 11 | (2, 5) | 0 | | | | |
| TDD and FDD frame | 12 | (5, 2) | 1 | | | | |
| TDD and FDD frame | 13 | (4, 2) | 1 | | | | |
| TDD and FDD frame | 14 | (3, 2) | 1 | | | | |
| TDD and FDD frame | 15 | (2, 2) | 1 | | | | |
| TDD and FDD frame | 16 | (1, 2) | 1 | | | | |
| TDD and FDD frame | 17 | (0, 2) | 1 | | | | |
| TDD and FDD frame | 18 | (3, 5) | 1 | | | | |
| TDD and FDD frame | 19 | (2, 5) | 1 | | | | |
| TDD frame | 20 | (11, 1) | 1 | (11, 1) | 1 | (11, 1) | 1 |
| TDD frame | 21 | (9, 1) | 1 | (9, 1) | 1 | (9, 1) | 1 |
| TDD frame | 22 | (7, 1) | 1 | (7, 1) | 1 | (7, 1) | 1 |
| TDD frame | 23 | (10, 1) | 1 | (10, 1) | 1 | | |
| TDD frame | 24 | (8, 1) | 1 | (8, 1) | 1 | | |
| TDD frame | 25 | (6, 1) | 1 | (6, 1) | 1 | | |
| TDD frame | 26 | (5, 1) | 1 | | | | |
| TDD frame | 27 | (4, 1) | 1 | | | | |
| TDD frame | 28 | (3, 1) | 1 | | | | |
| TDD frame | 29 | (2, 1) | 1 | | | | |
| TDD frame | 30 | (1, 1) | 1 | | | | |
| TDD frame | 31 | (0, 1) | 1 | | | | |

TABLE 3

| | | The number of the CSI RS configured | | | | | |
|---|---|---|---|---|---|---|---|
| | CSI RS | 1 or 2 | | 4 | | 8 | |
| | configuration index | (k', l') | $n_s$ mod 2 | (k', l') | $n_s$ mod 2 | (k', l') | $n_s$ mod 2 |
| TDD and FDD frame | 0 | (11, 4) | 0 | (11, 4) | 0 | (11, 4) | 0 |
| TDD and FDD frame | 1 | (9, 4) | 0 | (9, 4) | 0 | (9, 4) | 0 |

TABLE 3-continued

| | CSI RS configuration index | 1 or 2 (k', l') | 1 or 2 n$_s$ mod 2 | 4 (k', l') | 4 n$_s$ mod 2 | 8 (k', l') | 8 n$_s$ mod 2 |
|---|---|---|---|---|---|---|---|
| TDD and FDD frame | 2 | (10, 4) | 1 | (10, 4) | 1 | (10, 4) | 1 |
| TDD and FDD frame | 3 | (9, 4) | 1 | (9, 4) | 1 | (9, 4) | 1 |
| TDD and FDD frame | 4 | (5, 4) | 0 | (5, 4) | 0 | | |
| TDD and FDD frame | 5 | (3, 4) | 0 | (3, 4) | 0 | | |
| TDD and FDD frame | 6 | (4, 4) | 1 | (4, 4) | 1 | | |
| TDD and FDD frame | 7 | (3, 4) | 1 | (3, 4) | 1 | | |
| TDD and FDD frame | 8 | (8, 4) | 0 | | | | |
| TDD and FDD frame | 9 | (6, 4) | 0 | | | | |
| TDD and FDD frame | 10 | (2, 4) | 0 | | | | |
| TDD and FDD frame | 11 | (0, 4) | 0 | | | | |
| TDD and FDD frame | 12 | (7, 4) | 1 | | | | |
| TDD and FDD frame | 13 | (6, 4) | 1 | | | | |
| TDD and FDD frame | 14 | (1, 4) | 1 | | | | |
| TDD and FDD frame | 15 | (0, 4) | 1 | | | | |
| TDD frame | 16 | (11, 1) | 1 | (11, 1) | 1 | (11, 1) | 1 |
| TDD frame | 17 | (10, 1) | 1 | (10, 1) | 1 | (10, 1) | 1 |
| TDD frame | 18 | (9, 1) | 1 | (9, 1) | 1 | (9, 1) | 1 |
| TDD frame | 19 | (5, 1) | 1 | (5, 1) | 1 | | |
| TDD frame | 20 | (4, 1) | 1 | (4, 1) | 1 | | |
| TDD frame | 21 | (3, 1) | 1 | (3, 1) | 1 | | |
| TDD frame | 22 | (8, 1) | 1 | | | | |
| TDD frame | 23 | (7, 1) | 1 | | | | |
| TDD frame | 24 | (6, 1) | 1 | | | | |
| TDD frame | 25 | (2, 1) | 1 | | | | |
| TDD frame | 26 | (1, 1) | 1 | | | | |
| TDD frame | 27 | (0, 1) | 1 | | | | |

Referring to Table 2, each bit of the bitmap consisting of the zeroTxPowerResourceConfigList field corresponds to the CSI RS configuration index 0, 1, 2, 3, 4, 5, 6, 7, 8, 9, 20, 21, 22, 23, 24 and 25 from the MSB. Referring to Table 3, each bit of the bitmap consisting of the zeroTxPowerResourceConfigList field corresponds to the CSI RS configuration index 0, 1, 2, 3, 4, 5, 6, 7, 16, 17, 18, 19, 20 and 21 from the MSB. The UE may assume that the resource elements corresponding to the CSI RS configuration index configured as the zero-power CSI RS is the resource elements for the zero-power CSI RS.

However, the resource elements configured as the resource elements for the non-zero-power CSI RS by a higher layer may be excluded from the resource elements for the zero-power CSI RS.

A UE may transmit the CSI RS only in the downlink slot satisfying the condition of the $n_s$ mod 2 in Table 2 and Table 3. Also, a UE does not transmit the CSI RS in the special subframe of the TDD frame, in the subframe in which the transmission of the CSI RS collides with transmission of the synchronization signal, the physical broadcast channel (PBCH), and SystemInformationBlockType 1, or in the subframe in which a paging message is transmitted. In addition, in the set S such as S={15}, S={15, 16}, S={17, 18}, S={19, 20} or S={21, 22}, the resource element in which the CSI RS of one antenna port is transmitted is not used for the transmission of the PDSCH or the transmission of the CSI RS of other antenna ports.

Table 4 represents an example of the configuration of the subframe in which the CSI RS is transmitted.

TABLE 4

| CSI-RS-SubframeConfig $I_{CSI-RS}$ | CSI-RS Period $T_{CSI-RS}$ (Subframe) | CSI-RS Subframe Offset $\Delta_{CSI-RS}$ (subframes) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 4, the period ($T_{CSI-RS}$) and the offset ($\Delta_{CSI-RS}$) of the subframe in which the CSI RS is transmitted may be determined according to the CSI RS subframe configuration ($I_{CSI-RS}$). The CSI RS subframe configuration as shown in table 4 may be either one of the SubframeConfig field or the ZeroTxPowerSubframeConfig field of the CSI-RS-Config IE in Table 1. The CSI RS subframe configuration may be configured separately with respect to the non-zero-power CSI RS and the zero-power CSI RS. Meanwhile, the subframe that transmits the CSI RS is required to satisfy Equation 1.

$$(10n_f + \lfloor n_s/2 \rfloor \times \Delta_{CSI-RS}) \bmod T_{CSI-RS} = 0 \qquad \text{<equation 1>}$$

Figure 7:
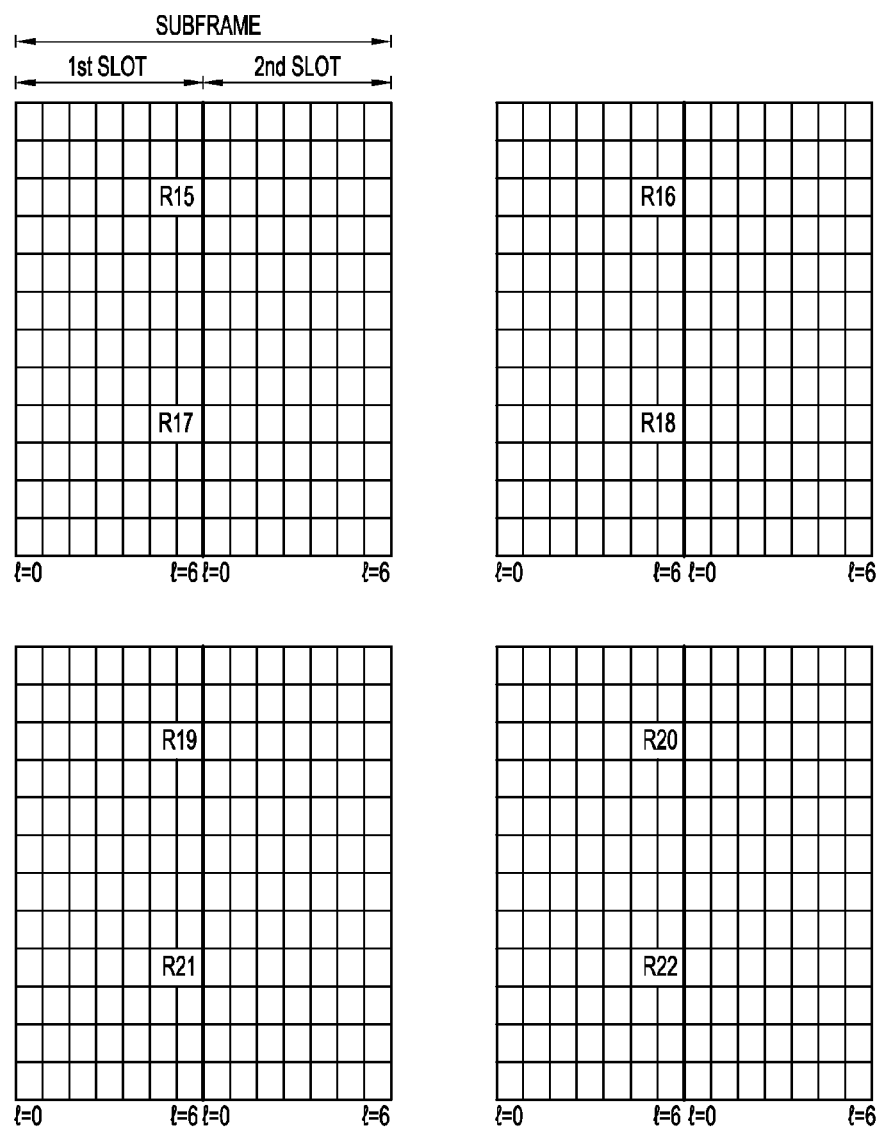
FIG. 7 shows an example of an RB to which a CSI-RS is mapped.

FIG. 7 shows an example of an RB to which a CSI-RS is mapped.

FIG. 7 shows resource elements used for the CSI-RS in a normal CP structure when CSI RS configuration index is zero. Rp denotes resource elements used for CSI-RS transmission on an antenna port p. Referring to FIG. 7, the CSI-RS for an antenna port 15 and 16 are transmitted through resource elements corresponding to a third subcarrier (subcarrier index 2) of a sixth and seventh OFDM symbol (OFDM symbol index 5, 6) of a first slot. The CSI-RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI-RS for an antenna port 19 and 20 is transmitted through the same resource elements as the CSI-RS for an antenna port 15 and 16 is transmitted. The CSI-RS for an antenna port 21 and 22 is transmitted through the same resource elements as the CSI-RS for an antenna port 17 and 18 is transmitted.

Figure 8:
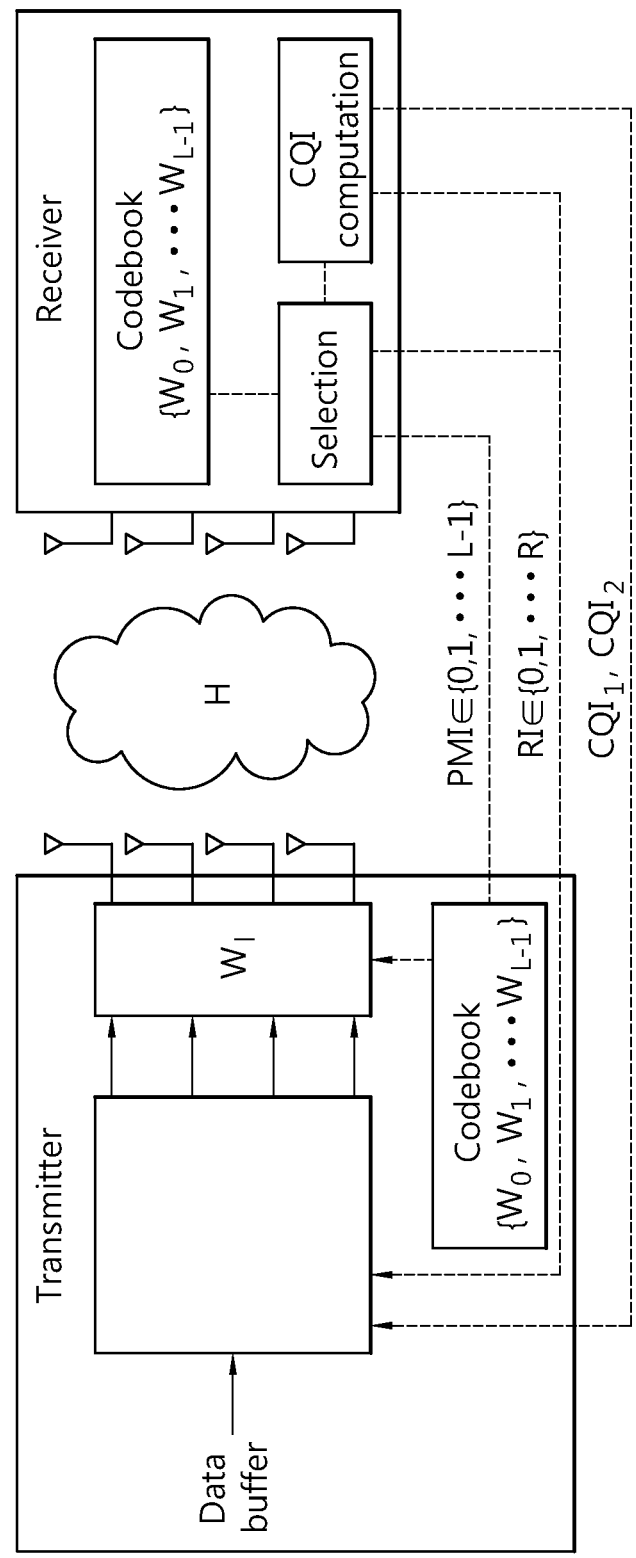
FIG. 8 shows a procedure of feedbacking a CSI in a 3GPP LTE.

FIG. 8 shows a procedure of feedbacking a CSI in a 3GPP LTE.

Referring to FIG. 8, a receiver may feedback RI, PMI, and CQI to a transmitter.

The RI may be determined based on the number of allocated transmission layers, and may be obtained from an associated DCI. A procedure of selecting the PMI is as follows. The receiver calculates a signal-to-noise interference ratio (SINR) which is post-processed with respect to each PMI in each rank, converts the calculated SINR into a sum capacity, selects an optimal PMI based on the sum capacity, and selects an optimal rank among optimal PMIs of each rank. The CQI may be transmitted based on a CQI table. A CQI index of 4 bits may indicate a modulation scheme and a coding rate. Table 5 represents an example of a CQI table.

TABLE 5

| CQI index | Modulation scheme | Coding rate (*1024) | Efficiency |
| --- | --- | --- | --- |
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The UE transmits the highest CQI index having a transmission block error rate (BLE) of 0.1 or lower. The CQI may be aperiodically transmitted on a PUSCH without data, and transmission of an aperiodic CQI may be indicated by a CQI request field of 1 bit in a DCI format 0. Transmission of the aperiodic CQI may use only QPSK modulation.

In the distributed multi-node system, the base station may request each UE to measure and feedback a CSI with respect to neighboring nodes. The base station may set CSI RS configurations UE-specifically, and the UE may measure and feedback a CSI based on the set CSI RS configurations to the base station. That is, the UE may measure the CSI based on the CSI RS transmitted through resource elements corresponding to the set CSI RS configurations to transmit the measured CSI RS to the base station.

Figure 9:
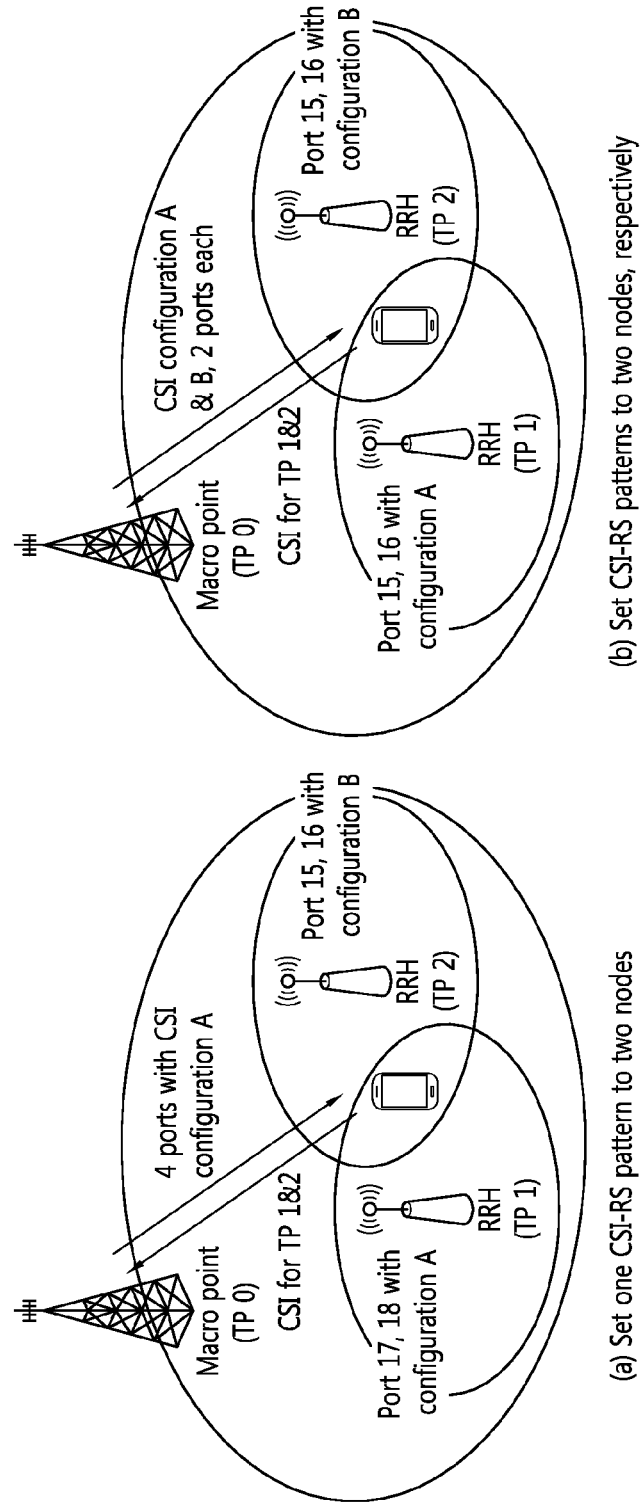
FIG. 9 shows an example of setting a CSI RS configuration.

FIG. 9 shows an example of setting a CSI RS configuration.

FIG. 9-(a) shows a case of setting the same CSI RS by two nodes. A first RRH (TP 1) of the base station set a CSI configuration A for antenna ports 17 and 18, and a second RRH (TP 2) of the base station set a CSI configuration A for antenna ports 15 and 16. That is, the base station sets the same CSI RS configuration A for four antenna ports. The UE measures and reports CSI for the first RRH and the second RRH to the base station. FIG. 9-(b) shows a case of setting different CSI RS configurations by two nodes. A first RRH (TP 1) of the base station set a CSI configuration B for antenna ports 15 and 16, and a second RRH (TP 2) of the base station set a CSI configuration A for antenna ports 15 and 16. That is, the base station set different CSI RS configurations A and B for two antenna ports. The UE measures and reports CSIs for the first RRH and the second RRH to the base station, respectively.

When setting a plurality of CSI RS configurations to the UE through the distributed multi-node system, different usages of the plurality of CSI RS configurations may be configured. Hereinafter, a method of setting a plurality of CSI RS configurations according to the embodiment of the present invention is described.

The base station may set different CSI RS configurations according to usages. For example, in the distributed multi-node system, uplink and downlink of the UE may be connected to different nodes. Hereinafter, it is assumed that a node connected to the uplink of the UE is a reception point (RP), and a node connected to the downlink of the UE is a transmission point (TP). The base station may differently set a CSI RS configuration to measure a downlink CSI and a CSI RS configuration to measure an uplink CSI. Alternatively, the base station may differently set a CSI RS configuration to measure path loss (PL), a CSI RS configuration to measure the CSI, and a CSI RS configuration to measure interference.

When the UE receives a plurality of CSI RS configurations configured according to different usages, the UE may perform different actions according to the received CSI RS configurations. When receiving the first CSI RS configuration, the UE may perform a first action. When receiving the second CSI RS configuration, the UE may perform a second action. For example, when receiving a CSI RS configuration for the TP, the UE may measure the CSI based on the corresponding CSI RS configuration. When receiving a CSI RS configuration for the RP, the UE may measure the path loss based on the corresponding CSI RS configuration. When one node corresponds to both of the TP and the RP, the UE may receive the CSI RS configuration for the TP and the CSI RS configuration for the RP to measure both of the CSI and the path loss.

Meanwhile, the UE may measure the path loss based on different CSI RS configurations according to a type of an uplink control signal or an uplink control channel. For example, in a TDD system, the UE may measure the path loss based on a CSI RS configuration for the TP and/or a node serving as both of the TP and the RP to control power of a first uplink control signal/channel. The UE may measure the path loss based on a CSI RS configuration for the RP and/or a node serving as both of the TP and the RP to control power of a second uplink control signal/channel. The first uplink control signal/channel may be a sounding reference signal (SRS). The second uplink control signal/channel may be a PUCCH and/or a PUSCH. Alternatively, the UE may measure the path losses based on different CSI RS configurations according to various types of SRSs, respectively. For example, the UE may measure path loss based on a CSI RS configuration for the TP and/or a node serving as both of the TP and the RP to control power of the first SRS. The UE may measure path loss based on a CSI RS configuration for the RP and/or a node serving as both of the TP and the RP to control power of the second SRS.

Hereinafter, a method of indicating a plurality of CSI RS configurations according to a usage according to the embodiment of the present invention is described. The CSI-RS-Config IE of Table 1 may be simply expressed as a following Table 6. In a following description, a CSI-RS-Config IE according to the embodiment of the present invention is described based on a CSI-RS-Config IE of the Table 6.

TABLE 6

CSI-RS-Config IE
{
csi-RS // (optional)
{
Antenna Ports: one from 1, 2, 4, and 8
Resource configuration: one integer from 0 to 31
Subframe configuration: one integer of 0 from 154
Power control: one integer from −8 to 15
}
zeroTxPowerCSI-RS // (optional)
{
zeroTxPowerResourceConfigList: bitmap of 16 bits TABLE 6-continued zeroTxPowerSubframeConfig: one integer from 0 to 154
}
}

1) The base station may transmit a plurality of CSI-RS-Contig IEs to the UE according to a plurality of CSI RS configurations, and may separately signal a usage of each CSI-RS-Config IE or may add information on the usage in each CSI-RS-Config IE.

2) The base station may transmit different CSI-RS-Config IEs according to usages, and CSI RS configurations used as the same usage may be indicated through one CSI-RS-Config IE. The CSI-RS-Config IE according to each usage may be classified according to different names or a bit indicating a usage in the CSI-RS-Config IE. Table 7 shows an example of the CSI-RS-Config IE indicating the CSI RS configuration according to a usage.

TABLE 7

CSI-RS-Config IE
{
for (allocation of multiple csi-RS configuration)
{
csi-RS // (optional)
{
Antenna Ports: one from 1, 2, 4, and 8
Resource configuration: one integer from 0 to 31
Subframe configuration: one integer from 0 to 154
Power control: one integer from −8 to 15
}
}
}

Referring to the Table 7, a plurality of CSI RS configurations having the same usage are allocated in one CSI-RS-Config. A zeroTxPowerCSl-RS IE is omitted from the Table 7 for the purpose of convenience, and the CSI-RS-Config IE may include other fields or IEs which are not listed in the Table 7.

Table 8 shows another example of the CSI-RS-Config IE indicating the CSI RS configuration according to a usage.

TABLE 8

CSI-RS-Config IE
{
csi-RS // (optional)
{
Antenna Ports: one from 1, 2, 4, and 8
Resource configuration: select a plurality of CSI configurations
by expressing 0~31 as bitmap
Subframe configuration: one integer from 0 to 154
Power control: one integer from −8 to 15
}
}

Referring to Table 8, a plurality of CSI RS configurations having the same usage are indicated as a bitmap in the CSI-RS-Config. The base station may indicate CSI RS configurations usable as the same usage as the bitmap. A zeroTxPowerCSl-RS IE is omitted from the Table 8, and the CSI-RS-Config IE may include other fields or IEs which are not listed in the Table 8.

3) The base station transmits one CSI-RS-Config IE to the UE. Different csi-RS IEs may be configured in one CSI-RS-Config IE according to the usage. The csi-RS IE according to each usage may be classified according to different names or a bit indicating a usage in the csi-RS IE. Table 9 shows another example of the CSI-RS-Config IE indicating the CSI RS configuration according to a usage.

TABLE 9

```
CSI-RS-Config IE
{
Usage1-csi-RS // (optional)
{
Antenna Ports: one from 1, 2, 4, and 8
Resource configuration: select a plurality of CSI configurations
by expressing 0~31 as bitmap
Subframe configuration: one integer from 0 to 154
Power control: one integer from −8 to 15
}
Usage2-csi-RS // (optional)
{
Antenna Ports: one from 1, 2, 4, and 8
Resource configuration: select a plurality of CSI configurations
by expressing 0~31 as bitmap
Subframe configuration: one integer from 0 to 154
Power control: one integer from −8 to 15
}
}
```

Referring to the Table 9, one CSI-RS-Config IE is transmitted to one UE, and a csi-RS is allocated in the CSI-RS-Config IE according to a usage. The CSI RS configuration according to each usage may be indicated in the csi-RS IE as the bitmap. A zeroTxPowerCSI-RS IE is omitted from the Table 9 for the purpose of convenience, and a CSI-RS-Config IE may include other fields or IEs which are not listed in the Table 9.

Table 10 shows another example of the CSI-RS-Config IE indicating the CSI RS configuration according to a usage.

TABLE 10

```
CSI-RS-Config IE
{
for (allocation of multiple csi-RS configuration for
first usage) (//optional)
{
csi-RS //
{
Antenna Ports: one from 1, 2, 4, and 8
Resource configuration: one integer from 0 to 31
Subframe configuration: one integer from 0 to 154
Power control: one integer from −8 to 15
}
}
for (allocation of multiple csi-RS configuration for
second usage) (//optional)
{
csi-RS //
{
Antenna Ports: one from 1, 2, 4, and 8
Resource configuration: one integer from 0 to 31
Subframe configuration: one integer from 0 to 154
Power control: one integer from −8 to 15
}
}
}
```

Referring to the Table 10, one CSI-RS-Config IE is transmitted to one UE, and the csi-RS is allocated in the CSI-RS-Config IE according to a usage. A plurality of CSI RS configurations having the same usage are allocated in one CSI-RS-Config. A zeroTxPowerCSI-RS IE is omitted from the Table 10 for the purpose of convenience, and the CSI-RS-Config IE may include other fields or IEs which are not listed in the Table 10.

The CSI-RS-Config IE described in the above embodiments is illustrative purpose only. Further, in the above embodiments, the zeroTxPowerCSI-RS IE is omitted for the purpose for convenience, but a zero-power CSI RS configuration may be allocated according to the usage. For example, the CSI RS configuration and the zero-power CSI RS configuration having the same usage may be included in one CSI-RS-Config IE or both of the CSI RS configuration and the zero-power CSI RS configuration according to each usage may be included in one CSI-RS-Config IE. That is, the UE may receive setting of the CSI RS configuration and the zero-power CSI RS configuration having various usages.

Figure 10:
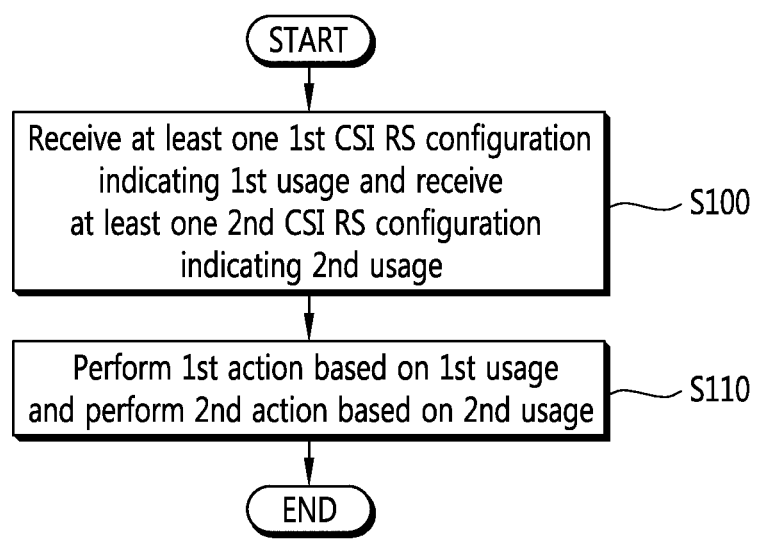
FIG. 10 shows an operation method of a UE according to an embodiment of the present invention.

FIG. 10 shows an operation method of a UE according to an embodiment of the present invention.

In step S100, the UE receives at least one first CSI RS configuration indicating a first usage from a base station and receives at least one second CSI RS configuration different from the at least first CSI RS configuration indicating a second usage different from the first usage. In step S110, the UE performs a first action based on the first usage, and performs a second action based on the second usage. The various CSI RS configurations described above may be applicable.

Figure 11:
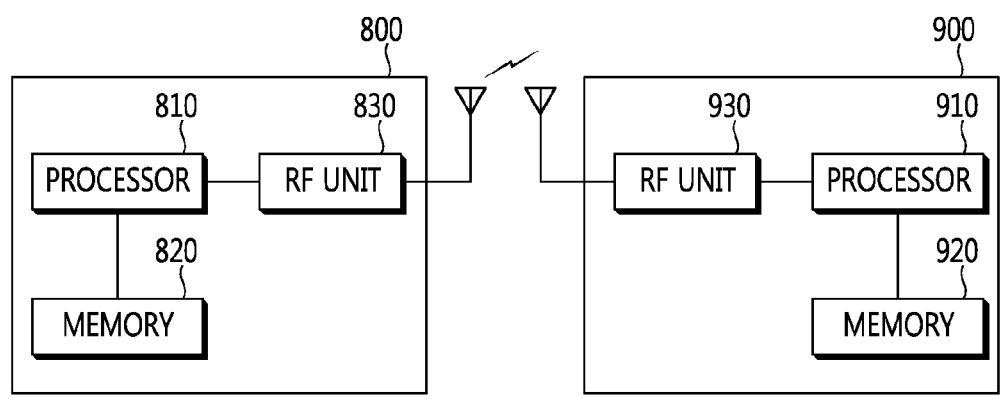
FIG. 11 is a block diagram showing wireless communication system to implement an embodiment of the present invention.

FIG. 11 is a block diagram showing wireless communication system to implement an embodiment of the present invention.

ABS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for measuring, by a user equipment (UE), channel state information (CSI) and interference in a wireless communication system, the method comprising:
   receiving at least one CSI reference signal (RS) resource configuration from a base station;
   receiving at least one CSI interference measurement (IM) resource configuration from the base station;
   measuring CSI based on the at least one CSI RS resource configuration; and
   measuring interference based on the at least one CSI IM resource configuration,
   wherein the at least one CSI RS resource configuration and the at least one CSI IM resource configuration are received separately via different information elements (IEs) from each other.

2. The method of claim 1, wherein the CSI is measured based a non-zero power CSI RS within at least one CSI RS resource configured by the at least one CSI RS resource configuration.

3. The method of claim 1, wherein the at least one CSI RS resource configuration is received via a higher layer.

4. The method of claim 1, wherein the at least one CSI RS resource configuration includes a non-zero power CSI RS configuration.

5. The method of claim 4, wherein the non-zero power CSI RS configuration indicates a configuration index of a CSI RS configuration used for the CSI measurement.

6. The method of claim 5, wherein the non-zero power CSI RS configuration is one of CSI RS configurations in Table below:

|  | CSI RS configuration | Number of CSI reference signals configured | | | | | |
|---|---|---|---|---|---|---|---|
|  |  | 1 or 2 | | 4 | | 8 | |
|  |  | $(k', l')$ | $n_s \bmod 2$ | $(k', l')$ | $n_s \bmod 2$ | $(k', l')$ | $n_s \bmod 2$ |
| FDD/TDD frame | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| TDD frame only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1, |  |  |  |  | where k' denotes a subcarrier location of a resource element where a non-zero power CSI RS is mapped in a slot, l' denotes a symbol location of a resource element where a non-zero power CSI RS is mapped in a slot, ns denotes a slot number, and $n_s$ mod 2 denotes the remainder of dividing $n_s$ by 2.

7. The method of claim 5, wherein the non-zero power CSI RS configuration is one of CSI RS configurations in Table below:

|  | CSI RS configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| FDD/TDD frame | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| TDD frame only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1, |  |  |  |  | where k' denotes a subcarrier location of a resource element where a non-zero power CSI RS is mapped in a slot, l' denotes a symbol location of a resource element where a non-zero power CSI RS is mapped in a slot, $n_s$ denotes a slot number, and $n_s$ mod 2 denotes the remainder of dividing $n_s$ by 2.

8. The method of claim 1, wherein the interference is measured based a zero power CSI RS within at least one CSI IM resource configured by the at least one CSI IM resource configuration.

9. The method of claim 1, wherein the at least one CSI IM resource configuration is received via a higher layer.

10. The method of claim 1, wherein the at least one CSI IM resource configuration includes a zero power CSI RS configuration.

11. The method of claim 10, wherein the zero power CSI RS configuration indicates a configuration index of a CSI RS configuration used for the interference measurement.

12. The method of claim 11, wherein the zero power CSI RS configuration is one of CSI RS configurations in Table below:

| CSI RS configuration | Number of CSI reference signals configured | | | | | |
|---|---|---|---|---|---|---|
|  | 1 or 2 | | 4 | | 8 | |
|  | (k', l') | $n_s$ mod 2 | (k', l') | $n_s$ mod 2 | (k', l') | $n_s$ mod 2 |
| FDD/ TDD frame | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |

-continued

| CSI RS configuration | Number of CSI reference signals configured | | | | | |
|---|---|---|---|---|---|---|
|  | 1 or 2 | | 4 | | 8 | |
|  | (k', l') | $n_s$ mod 2 | (k', l') | $n_s$ mod 2 | (k', l') | $n_s$ mod 2 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 |  |  |
| 6 | (10, 2) | 1 | (10, 2) | 1 |  |  |
| 7 | (8, 2) | 1 | (8, 2) | 1 |  |  |
| 8 | (6, 2) | 1 | (6, 2) | 1 |  |  |
| 9 | (8, 5) | 1 | (8, 5) | 1 |  |  |
| 10 | (3, 5) | 0 |  |  |  |  |
| 11 | (2, 5) | 0 |  |  |  |  |
| 12 | (5, 2) | 1 |  |  |  |  |
| 13 | (4, 2) | 1 |  |  |  |  |
| 14 | (3, 2) | 1 |  |  |  |  |
| 15 | (2, 2) | 1 |  |  |  |  |
| 16 | (1, 2) | 1 |  |  |  |  |
| 17 | (0, 2) | 1 |  |  |  |  |
| 18 | (3, 5) | 1 |  |  |  |  |
| 19 | (2, 5) | 1 |  |  |  |  |

-continued

| CSI RS config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| TDD frame only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1, | | | | | where k' denotes a subcarrier location of a resource element where a zero power CSI RS is mapped in a slot, l' denotes a symbol location of a resource element where a zero power CSI RS is mapped in a slot, $n_s$ denotes a slot number, and $n_s$ mod 2 denotes the remainder of dividing $n_s$ by 2.

13. The method of claim 11, wherein the zero power CSI RS configuration is one of CSI RS configurations in Table below:

| CSI RS configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| FDD/TDD frame 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| TDD frame only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1, | | | | | where k' denotes a subcarrier location of a resource element where a zero power CSI RS is mapped in a slot, l' denotes a symbol location of a resource element where a zero power CSI RS is mapped in a slot, $n_s$ denotes a slot number, and $n_s$ mod 2 denotes the remainder of dividing $n_s$ by 2.

14. The method of claim 1, further comprising:

computing a channel quality indicator (CQI) based on the measured CSI and the measured interference.

15. A user equipment (UE) in a wireless communication system, the UE comprising:

a radio frequency (RF) unit for transmitting or receiving a radio signal; and a processor coupled to the RF unit, and configured to:

receive at least one channel state information (CSI) reference signal (RS) resource configuration from a base station;

receive at least one CSI interference measurement (IM) resource configuration from the base station;

measure CSI based on the at least one CSI RS resource configuration; and measure interference based on the at least one CSI IM resource configuration, wherein the at least one CSI RS resource configuration and the at least one CSI IM resource configuration are received separately via different information elements (IEs) from each other.

* * * * *